(12) United States Patent
Wang

(10) Patent No.: US 6,826,953 B2
(45) Date of Patent: Dec. 7, 2004

(54) FLOW SENSOR

(75) Inventor: Chiun Wang, Cerritos, CA (US)

(73) Assignee: Celerity Group, Inc., Santa Clara, CA (US)

( * ) Notice: Subject to any disclaimer, the term of this patent is extended or adjusted under 35 U.S.C. 154(b) by 0 days.

(21) Appl. No.: 10/623,147

(22) Filed: Jul. 18, 2003

(65) Prior Publication Data

US 2004/0123672 A1 Jul. 1, 2004

Related U.S. Application Data

(60) Provisional application No. 60/397,461, filed on Jul. 19, 2002.

(51) Int. Cl.[7] ................................................. G01F 1/68
(52) U.S. Cl. .................................................... 73/202.5
(58) Field of Search .......................... 73/202.5, 861.42, 73/861.52, 204.21, 204.22

(56) References Cited

U.S. PATENT DOCUMENTS

| | | | |
|---|---|---|---|
| 4,519,246 A | 5/1985 | Hartemink | |
| 5,050,131 A | * 9/1991 | Wang et al. | 367/73 |
| 5,094,430 A | 3/1992 | Shirai et al. | |
| 5,295,394 A | 3/1994 | Suzuki | |
| 5,309,762 A | 5/1994 | Satoh et al. | |
| 5,730,181 A | 3/1998 | Doyle et al. | |
| 5,804,717 A | * 9/1998 | Lucas | 73/202 |
| 5,824,894 A | 10/1998 | Lucas et al. | |
| 5,837,903 A | * 11/1998 | Weigand | 73/861.42 |
| 5,911,238 A | 6/1999 | Bump et al. | |
| 5,965,813 A | 10/1999 | Wan et al. | |
| 6,044,701 A | 4/2000 | Doyle et al. | |
| 6,158,679 A | 12/2000 | Ohmi et al. | |
| 6,247,495 B1 | 6/2001 | Yamamoto et al. | |
| 6,561,218 B2 | 5/2003 | Mudd | |

* cited by examiner

Primary Examiner—Edward Lefkowitz
Assistant Examiner—Jewel V. Thompson
(74) Attorney, Agent, or Firm—Lowrie, Lando & Anastasi, LLP

(57) ABSTRACT

An apparatus and method for measuring flow. A flow sensor includes a sensor conduit and a bypass having at least one capillary tube. At least one of the length, inside diameter, and cross-sectional shape of the sensor conduit is substantially equal to the corresponding length, inside diameter, and cross-sectional shape of the at least one capillary tube.

15 Claims, 13 Drawing Sheets

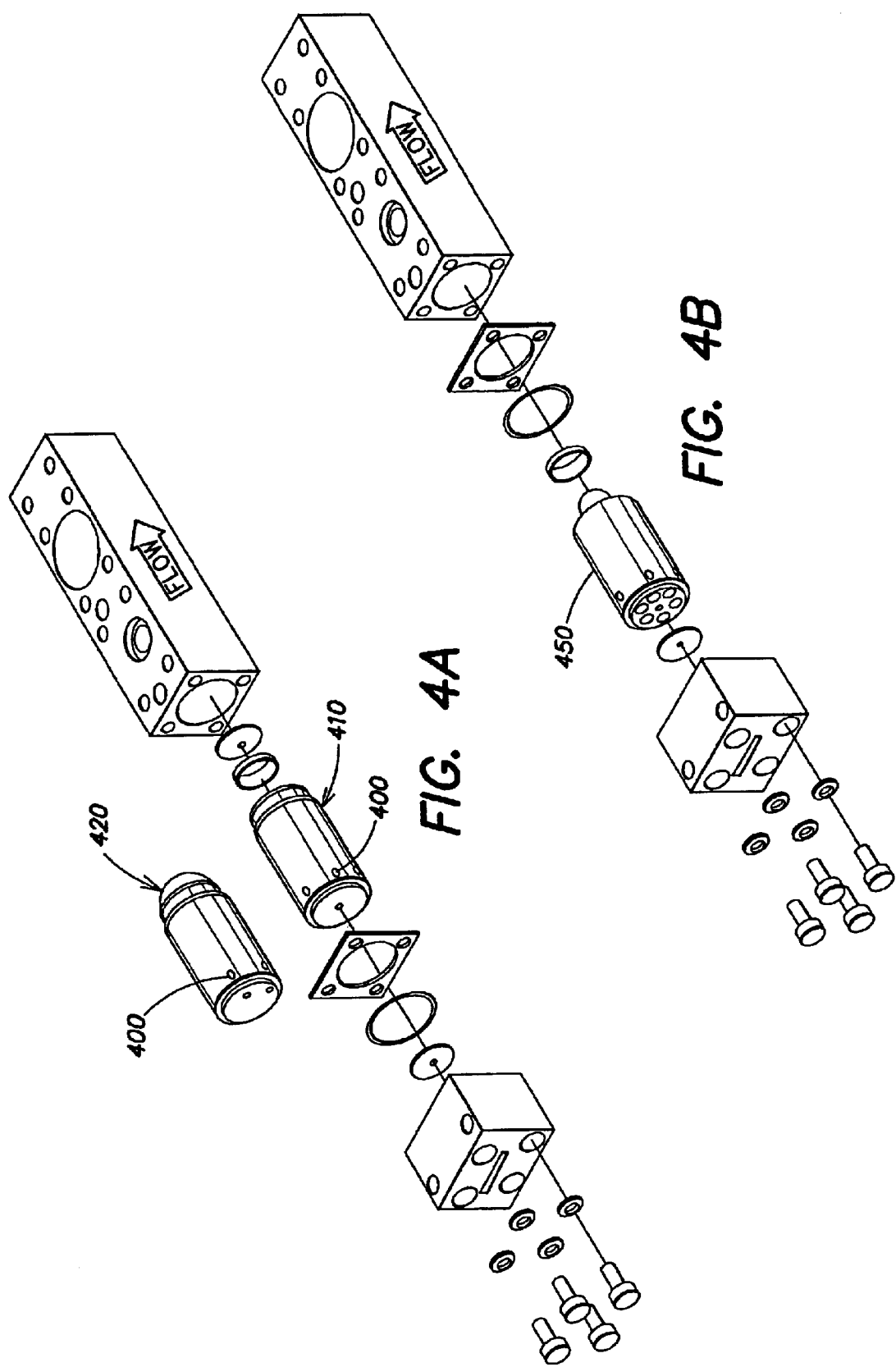

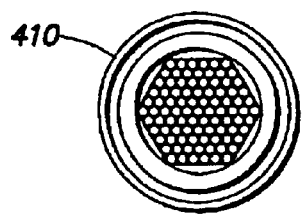
(TUBE #3, 91 MAX, WITH
20 BENT TUBES MIN.)
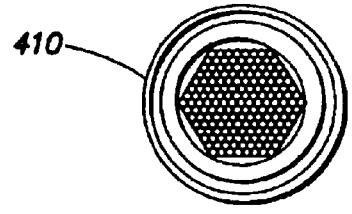
(TUBE #2, 169 MAX, WITH
34 BENT TUBES MIN.)
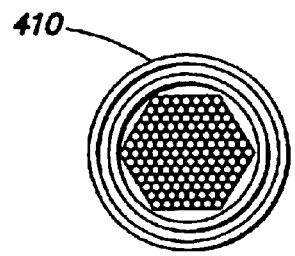
(TUBE #3, 127 MAX, WITH
26 BENT TUBES MIN.)
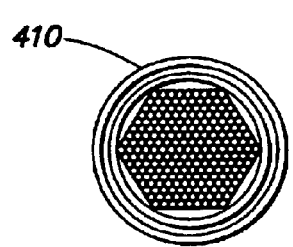
(TUBE #2, 217 MAX, WITH
44 BENT TUBES MIN.)
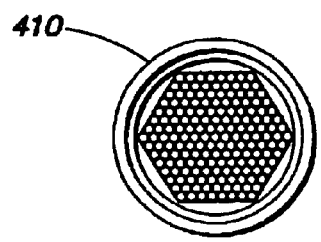
(TUBE #3, 169 MAX, WITH
34 BENT TUBES MIN.)
FIG. 9

(TUBE #1, 88 MAX, AND #4 PIN IN CENTER WITH 5 BENT TUBES MIN IN EACH HOLE.)

(TUBE #1, 99 MAX, AND #4 PIN IN CENTER WITH 5 BENT TUBES MIN IN EACH HOLE).

(TUBE #1, 271 MAX, WITH 55 BENT TUBES MIN.)

(TUBE #1, 11 MAX
OR TUBE #2 7 MAX)

(TUBE #1, 33 MAX
OR TUBE #2 21 MAX)

(TUBE #1, 11 MAX, AND
4 PIN IN CENTER WITH
5 BENT TUBES MIN.)

(TUBE #1, 33 MAX, AND #4 PIN
IN CENTER WITH 5 BENT
TUBES MIN IN EACH HOLE.)

FLOW SENSOR

This application claims priority to U.S. Provisional Application Ser. No. 60/397,461 filed Jul. 19, 2002, entitled FLOW SENSOR BYPASS, which is herein incorporated by reference in its entirety.

FIELD OF INVENTION

The present invention relates to a capillary flow sensor and, in particular, a capillary flow sensor with a capillary bypass.

BACKGROUND

Flow control of fluids is important in many industries. For example, many processes in the manufacture of semiconductors require a precise reaction of two or more gases under controlled conditions. Mass flow meters are used to control molecular level chemical reactions.

Mass flow meters typically operate on the principle of directing fluid flow through two parallel passageways or branches. One passageway provides a sensor flow path for measuring the rate of mass flow of fluid, while the other passageway provides a main flow path through which the remainder (and bulk) of the fluid flows. The two parallel passageways are generally fluidly connected at each end, such that the total amount of fluid flowing through the flow meter is the sum of the fluid flowing in the sensor flow path plus the fluid flowing in the main flow path. In order for the mass flow sensor to provide accurate measurements, the ratio between the amount of fluid flowing in the sensor flow path and the amount of fluid flowing in the main flow path should ideally be constant over the range of flow rates, pressures, temperatures, etc. with which the flow meter is intended to operate. The actual ratio between the sensor path and the main flow path is, however, determined by the matching of the 'pressure-flow' characteristic between the sensor path and the bypass path.

Conventional mass flow meters that measure the mass flow rate of a fluid (liquid or gas) through a conduit are known. Thermal mass flow sensors that employ one or more temperature sensitive resistance elements in thermal communication with a sensor tube and provide an electrical output signal are also known. These sensors operate on the principle that the rate of heat transfer from the walls of the sensor tube, a laminar flow channel, to a fluid passing through the sensor tube is a function of the temperature gradient between the fluid and the channel walls, the specific heat of the fluid, and the mass flow rate of the fluid within the channel. Because the specific heat of a fluid does not vary greatly with pressure or temperature, a thermal mass flow sensor that is calibrated for a particular fluid will give accurate mass flow rate readings over a wide range of operating conditions.

Thermal mass flow sensors typically include one or more heating elements that transfer energy to a fluid flowing in a sensor tube usually having a cross-section of capillary size dimensions. It is common for the sensor tube to include an inlet and an outlet, each fluidly connected to a main fluid flow channel of the mass flow meter. The sensor tube inlet is typically located downstream of a main fluid flow channel inlet, and the sensor tube, outlet is typically located upstream of a main fluid flow channel outlet. As fluid flows through the sensor tube, heat is carried from the upstream heating element or resistor toward the downstream heating element or resistor, with the temperature difference being proportional to the mass flow rate of the fluid flowing through the sensor tube and the main fluid flow channel.

A bypass, or laminar flow element, is typically located in the main fluid flow channel positioned between the input and the output of the sensor tube to insure laminar flow through the bypass section of the main fluid flow channel up to a maximum designed flow rate. Above this maximum, the flow becomes turbulent. FIG. 1 illustrates a conventional flow meter 100 having a mass flow sensor tube 102 with capillary bypass 104 consisting of multiple capillary tubes 106 bundled together in parallel to provide laminar flow through the bypass. Generally, when a fluid flows through a laminar flow element, such as a bundle of capillary tubes 106, a pressure differential between opposite ends of the mass flow sensor is proportional to volume flow of fluid if the fluid forms a laminar flow. Typically, the inlet to the sensor tube is located upstream of the capillary bypass inlet, and the sensor tube outlet is located downstream of the bypass outlet. It is known that fluid flow is laminar when the Reynold's number is not more than 2,000.

The ratio of the mass of fluid flowing though the sensor tube to the total mass of fluid flowing through the input to the main fluid flow channel is commonly referred to as the "splitting ratio." The splitting ratio is determined by the geometries of the sensor tube, the main fluid flow channel, and the bypass. Ideally, the splitting ratio is constant over the entire range of mass flow rates for which the flow meter was designed. When the splitting ratio is constant, the bypass is said to be 'linear'. Unfortunately, in practice the splitting ratio typically varies, both as a function of the rate of mass flow of fluid over the measurable range, and as a function of the viscosity of the fluid used for the application (e.g. the splitting ratio for one fluid may differ from that of another (e.g. more or less dense)) fluid at the same flow rate.

Sometimes the splitting ratio of a particular flow meter may be locally optimized by selecting an appropriate bypass in a conventional mass flow meter so that it is made reasonably constant within a certain range of mass flow rates. However, a conventional mass flow meter designed for low flow rate applications is not appropriate for high flow rate applications, and vice versa. On the one hand, measurement of the flow rate is accurate only if the fluid flow past the bypass is linear, and typically, flow rates at the low end of the designed flow range are more linear than flow rates at the high end of the designed flow range. On the other hand, attempts to measure too low a flow rate below the designed flow range of the bypass can result in insufficient flow rates through the sensor tube, which can lead to inaccurate measurements of the differences between the two heating elements. This may further lead to too low a sensor output signal to offer any flow readings with good accuracy. Alternatively, attempts to measure a flow rate that exceeds the bypass design flow range can render the split ratio significantly nonlinear and detrimentally affect the accuracy of the flow sensor.

Inaccurate readings may also result when a flow sensor designed for one fluid is used with a different fluid. Different fluids have different viscosities, which affects the Reynolds number (see Detailed Description below) of the flow in the tube. Since the Reynolds number governs the 'pressure-flow' characteristics, different fluids therefore produce different 'pressure-flow' characteristics in the sensor and the bypass. Also, because the sensor tube is heated, a feature of the sensor, the temperature of the fluid in the sensor tube differs from the temperature of the fluid in the main fluid or bypass channel. Because fluid viscosity varies with temperature, and pressure drop is proportional to viscosity, and different fluids have different viscosity verses temperature curves, different fluids may again have different splitting ratios in the same flow sensor.

SUMMARY

In one embodiment, the present invention provides a flow sensor comprising a housing having a fluid inlet and fluid outlet. A bypass comprising at least one capillary tube is disposed between and fluidly connected to the inlet and the outlet, and a sensor unit is fluidly connected to the inlet and outlet via a sensor conduit. The at least one capillary tube has a length substantially equal to that of the sensor conduit. The capillary tube may also have an inside diameter and/or a cross-sectional shape substantially equal to the inside diameter and cross-sectional shape of the sensor conduit.

In another embodiment of the invention, a flow sensor comprising a housing, a bypass, and a sensor unit is provided. The housing includes an inlet and an outlet. The bypass includes at least one capillary tube disposed between and fluidly connected to the inlet and the outlet. The senor unit is fluidly connected to the housing inlet and outlet via a sensor conduit. The at least one capillary tube has an entrance effect substantially equal to an entrance effect of the sensor conduit.

Another embodiment is directed to a process for measuring fluid flow comprising passing a portion of a fluid through at least one bypass tube having an entrance effect, passing another portion of the fluid through a sensor unit having a sensor conduit with an entrance effect substantially equal to the entrance effect of the at least one bypass tube, and measuring a characteristic of the fluid in the senor conduit.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non-limiting embodiments of the present invention will be described by way of example with reference to the accompanying drawings, in which:

FIG. 4A is an exploded view of the bypass housing of FIGS. 3A and 3B.

FIG. 4B is an exploded view of the bypass housing of FIG. 3C.

FIG. 9 illustrates end views of capillary tubes positioned in the bypass of FIG. 7A.

DETAILED DESCRIPTION

The present invention is directed to a flow sensor having improved bypass linearity over a wide range of flows and fluid properties. Conventional mass flow meters or controllers employ arbitrary sensor paths and bypass paths which do not have matching 'pressure-flow' characteristics. One example of these conventional mass flow controllers may consist of a 2.0 inches long capillary sensor tube with 0.013 inches inside diameter, and a bypass composed of 1.0 inch long capillary tube with 0.030 inches inside diameter. Another example of the conventional mass flow controllers may consist of a 3.0 inches long capillary sensor tubes with 0.010 inch inside diameter, and a bypass composed of an annular gap formed between a conical plug and a conical housing. In either of these examples, the 'pressure-flow' characteristic curve of the sensor is significantly different from the characteristic curve of the bypass, in such a way that when the ratio of the flow rate is calculated between the bypass and the sensor, a non-constant split-ratio is obtained as a function of flow rate. This is known as the bypass nonlinearity. Bypass nonlinearity reduces the accuracy and the increases the cost required for calibrating the mass flow controllers.

Figure 1:
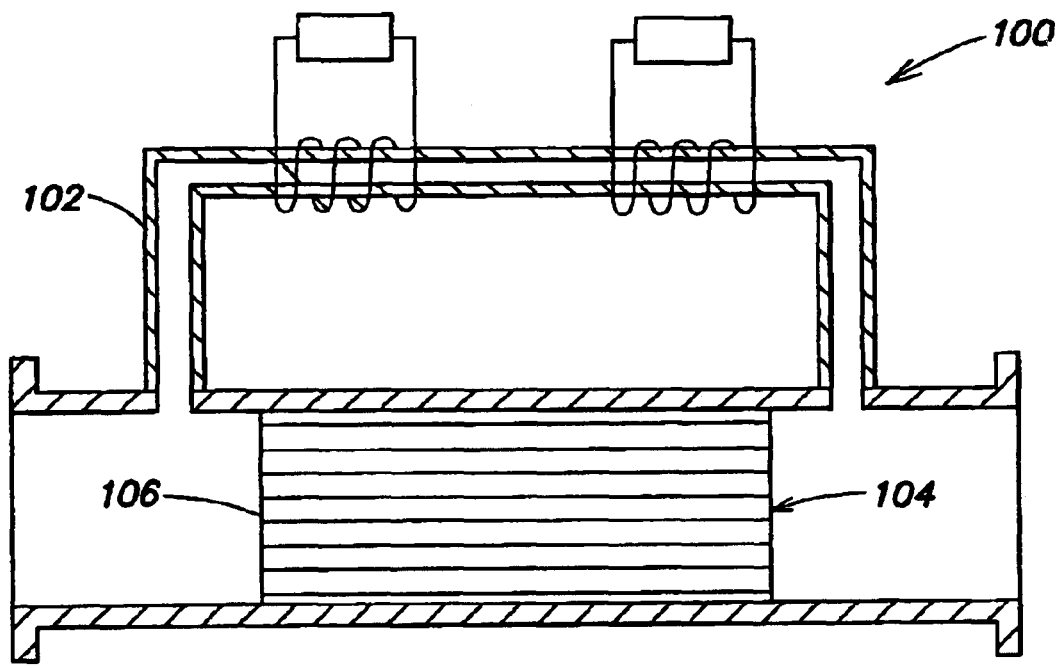
FIG. 1 illustrates a conventional mass flow controller.
Figure 2:
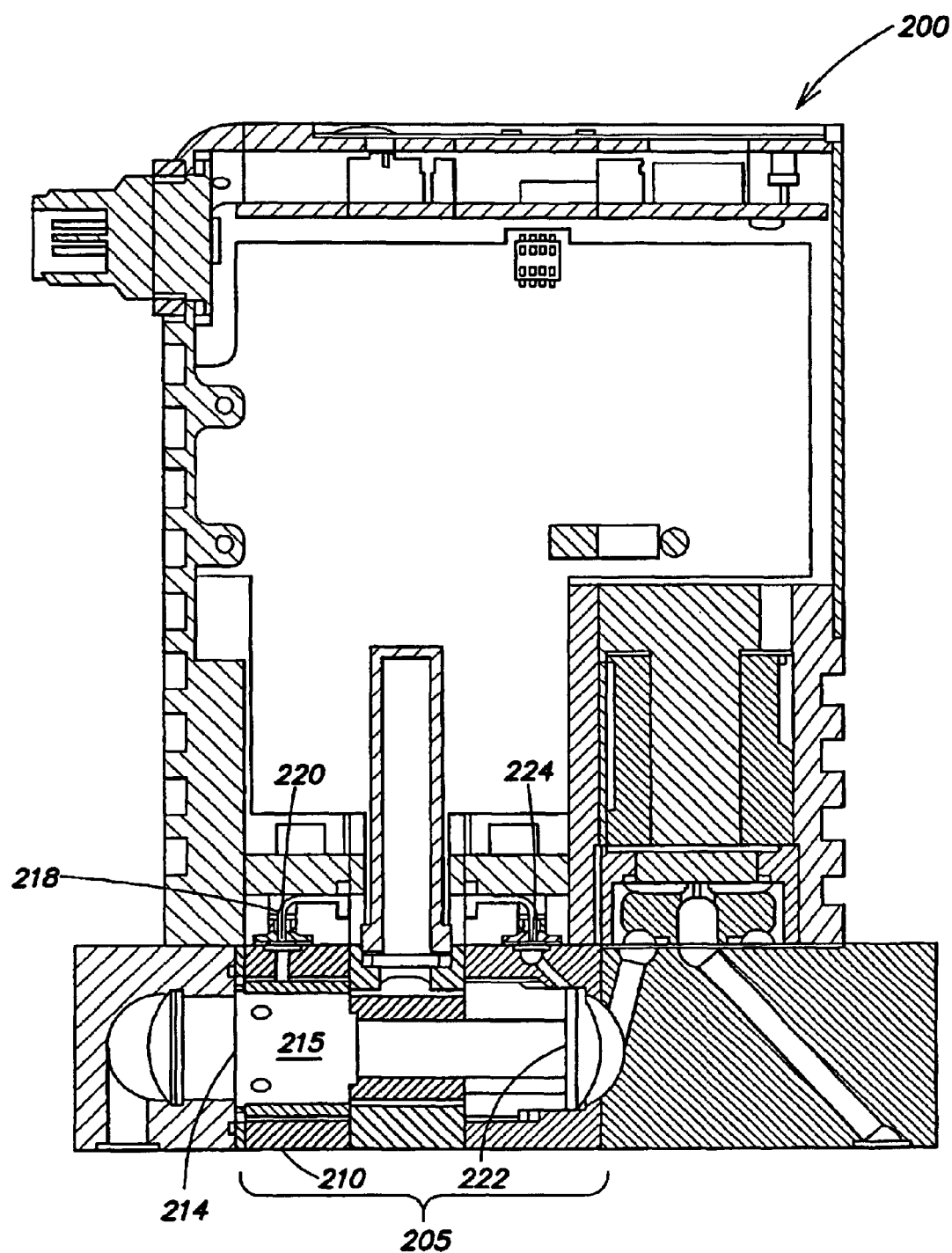
FIG. 2 illustrates one embodiment of a mass flow controller that includes a flow sensor with a flow sensor conduit and a bypass of the present invention.

FIG. 2 illustrates a mass flow controller 200 that includes a mass flow sensor 205 in accordance with the present invention. The flow sensor 205 provides a bypass housing 210 having a fluid inlet 214 and a fluid outlet 222 in which a bypass 215 is disposed. As used herein, a fluid is defined as a liquid or gas. A sensor conduit 218 has an inlet 220 and outlet 224. The bypass 215 comprises one or more capillary tubes having a length substantially equal to the length of the capillary sensor conduit. The sensor conduit and the one or more capillary tubes may also have substantially similar inside diameters and substantially similar cross-sectional shapes. The terms "substantially equal to" or "substantially the same" are used herein to define properties which are identical or nearly identical, and is intended to include variations which occur during production. As is known in the art, the phrase "capillary tube" is used herein to define any tube having a small bore and may, but not necessarily, include significant capillary action by which the surface of the fluid is elevated or depressed because of the relative attraction of the molecules of the fluid for each other and for those of the solid.

In one embodiment of a sensor conduit and capillary bypass combination, the lengths of the sensor conduit and the one or more bypass capillary tubes are substantially equal. In a preferred embodiment, the length and inside diameter of the sensor conduit are substantially equal to the length and diameter of the one or more bypass capillary tubes. In a more preferred embodiment, the length, diameter and cross-sectional shape of the sensor conduit are substantially equal to the length, diameter and cross-sectional shape of the one or more bypass capillary tubes to obtain identical 'pressure-flow' characteristics for the sensor and the bypass. It should be appreciated that any combination of length, diameter, and cross-sectional shape of the sensor conduit which provides substantially identical 'pressure-flow' characteristics to the one or more bypass capillary tubes may be used to increase the linearity of the senor in accordance with the present invention.

In FIG. 2, sensor conduit inlet 220 of sensor unit 218 is fluidly connected to the housing inlet 214. In a preferred embodiment, the sensor conduit is a capillary tube. In general, fluid flows from the housing inlet 214 through the bypass 215 to the housing outlet 222 and a portion of the fluid flows through sensor conduit 218. Because the length of the sensor conduit and the one or more capillary tubes are substantially equal, and the inside diameter and the cross-sectional shape of the sensor conduit and the one or more capillary tubes are also substantially the same, the bypass split-ratio remains constant and the range of bypass linearity increases, thereby increasing the accuracy of the sensor reading over a wide range of flow rates and gas properties. Also, because of the improved bypass linearity, the operable range of the flow sensor is increased at the high flow range of the sensor. Moreover, the improved linearity results in greater accuracy when switching between different fluids, thereby avoiding additional testing on other fluids.

The capillary tubes may be made of any material selected for its compatibility with housing 210 and the fluid expected to flow through the capillary tube. For example, the capillary tubes may be made of non-corrosive materials, such as, metal or plastic. In one embodiment, the capillary tubes are made of a valve metal. In a preferred embodiment, the capillary tube is made of 304 stainless steel or 316L stainless steel. The capillary tubes in the housing may vary in location. Two or more capillary tubes may vary in arrangement with respect to each other, however, the capillary tubes should be substantially parallel. The capillary tubes may be machined with fine tolerances. The capillary tubes may be of any shape such as square, circle, rectangle, triangle, etc. Other cross-section shapes, such as, pentagon, hexagon, trapezoid, are all contemplated within the scope of this invention. The capillary tubes may be a rolled metal sheet having a slit along a side to allow compression for inserting a capillary tube into a housing, as well as to allow expansion for providing tension against the housing. The capillary tubes may also have a cross section of any pre-selected irregular shape. Any combination of cross-sectional shape and length that produce laminar flow for the fluid may be used.

For laminar flow to occur through a tube, certain basic conditions must be met. These conditions are established by the physical properties of the fluid passing through the system, the maximum flow rate of the fluid, and the maximum pressure drop allowable for the fluid in the system. The volumetric rate of flow, Q, for a fluid passing through a capillary tube may be calculated by $Q=\pi(\Delta P)r^4/8\mu L$ where $\Delta P$ is the pressure drop across the sensor structure, r is the effective radius of the capillary tube's cross section, $\mu$ is the viscosity of the fluid passing through the sensor, and L is the length of the capillary tube. The viscosity $\mu$ for a given fluid is known and the volumetric flow rate Q and the pressure drop $\Delta P$ are experimentally established parameters. However, in order to provide laminar flow through the structure, a maximum Reynold's (Re) number that will ensure laminar flow in the system must not be exceeded for the capillary tube. The Re number is $Re=2rV\rho/\mu$, where V is the fluid mean velocity, $\rho$ is the fluid density, and $\mu$ is the fluid viscosity. To ensure laminar flow, the Re number must be below the maximum Re number producing laminar flow ($R_{mlf}$), so that $r=R_{mlf}\mu/2\rho V$. Substituting V, which for essentially round capillaries is $V=Q/\pi r^2$, and substituting for $r=2Q\rho/R_{mlf}\pi\mu$, then $r \geq 2Q\rho/R_{mlf}\pi\mu$ ensures laminar flow. Any passageway that provides laminar flow through the bypass may be used, however the passageways tend to be small, such as capillary tubes. In a preferred embodiment of the present invention, the capillary tubes have a substantially circular cross sectional area, and have an inner diameter of about 0.005 inch to about 0.05 inch and have a length ranging from about 1 inch to about 1.5 inches.

In addition to maintaining a laminar flow in the tube, it is preferred that the capillary tube and sensor conduit have substantially the same 'entrance effect' at the tube entrance where laminar flow is not fully developed. The flow in a circular tube starts out at the entrance of the tube in the form of a two-dimensional boundary layer. As the flow progresses downstream, the two-dimensional boundary layer grows, meets, and joins at the centerline of the tube. Eventually after having traveled a certain distance downstream, a steady parabolic velocity profile emerges. Laminar flow in a capillary tube is said to be 'fully-developed' when the velocity distribution in the tube exhibits a steady parabolic profile. The 'pressure-flow' relationship in a fully-developed laminar tube flow is described by the equation $Q=\pi(\Delta P)r^4/8\mu L$ accurately; however, this relationship does not apply in the tube entrance region where the flow is not fully-developed.

The flow in the entrance region of the tube contributes to the overall pressure drop in a non-linear manner. If the flow in the majority portion of the tube is fully developed, then the pressure-flow relation is essentially entirely governed by the above equation, and the pressure-flow relation is said to be linear. If, however, the entrance region accounts for a significant portion of the entire tube length, then the pressure-flow relationship deviates from the above equation and becomes nonlinear. The severity of the entrance effect on the pressure-flow nonlinearity is inversely proportional to the parameter L/(D×Re), i.e., the ratio of the tube length L to the product of the Reynolds number and the diameter of the capillary tube. When the ratio L/(D×Re) is sufficiently large (for example, greater than 100), the flow is almost entirely fully-developed; the entrance effect is almost negligible, and the pressure-flow relationship is almost perfectly linear. When the ratio L/(D×Re) is less than 10, then a significant portion of the flow in the tube suffers from the entrance effect, and the pressure-flow relationship is significantly nonlinear.

For the sensor bypass combination in the limited space of a mass flow controller, it is impractical to use capillary tubes with vary large L/D. Therefore the flow in the tubes of a mass flow controller is generally never completely fully-developed, and some pressure-flow nonlinearity is bound to occur. Bypass nonlinearity due to the entrance effect causes the bypass splitting ratio to vary as a function of flow. Embodiments of the present invention minimize the variation of the bypass splitting ratio by using capillary tubes of the same length, the same inside diameter, and the same cross-sectional shape so that the same ratio L/(D×Re) is reached simultaneously in the sensor capillary tube and the bypass capillary tubes by design. Thus, the nonlinear characteristics of the sensor and that of the bypass match each other, to the extent that at a common pressure drop, substantially the same amount of gas will flow through each bypass capillary tube as will flow through the sensor capillary tube.

Figure 13:
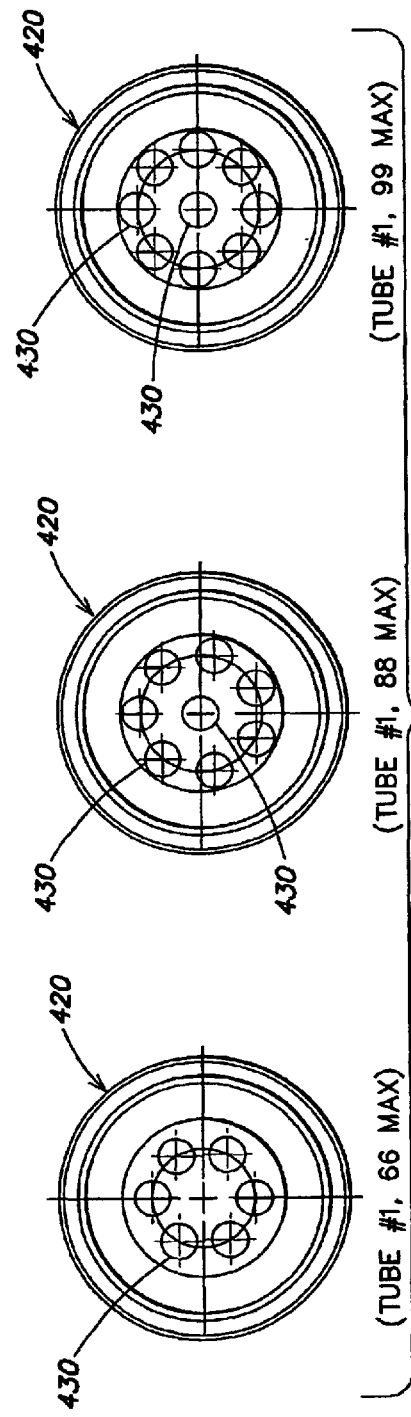
FIG. 13 illustrates an end view of other embodiments of the bypass of FIG. 10.

As noted above, the capillary tubes may be arranged in any configuration in the bypass. For example, the capillary tubes may be bundled and closely packed in the bypass. The bypass may also have any internal shape, such as, circular, triangular, square, hexagon, octagon, etc. In one embodiment, the interior surface of the bypass is hexagonal in shape, and closely packed with capillary tubes. In another embodiment, the interior surface of the bypass is circular. In another embodiment, the interior of the bypass may consist of one or more fluid flow apertures for supporting capillary tubes. The apertures may also be constructed and arranged in any configuration to support the capillary tubes. For example, the apertures may be circular, hexagonal, etc. and may be randomly spaced throughout the interior of the bypass. Alternatively, the apertures may be uniformly spaced throughout the bypass as illustrated in FIG. 13. In one embodiment, circular apertures are uniformly spaced in a circular pattern in the bypass, with optionally one or more additional circular apertures located at the center of the bypass. These apertures may, for example, be machined as through holes of a convenient diameter that may then be filled with a number of capillary tubes and/or pins, as discussed further below. It should be appreciated that such an embodiment avoids the cost and precision that would be necessary to machine individual tubes of capillary dimensions in the bypass. Any number of capillary tubes may be used as a bypass, based on the overall desired flow, rate and physical characteristics of the fluid.

The flow rate may also be controlled by altering the size, shape and number of the capillary tubes, as well as with a flow restrictor. A flow restrictor reduces the volume available for fluid flow. For a given aperture, a flow restrictor, such as a pin to replace a bypass tube, reduces the number of bypass tube spaces available for fluid flow. The flow restrictor may be, but is not limited to, a plug, a seal, a cap, and the like positioned on, in, or adjacent to the capillary tube. Alternatively, a flow restrictor may replace a capillary tube. One construction of a flow restrictor is in the form of a pin like device which may be inserted into a capillary tube or alternatively adjacent to a capillary in a fluid flow aperture in the bypass. The pin(s) may be solid to completely prevent the flow of fluid, or alternatively, may be hollow so as to reduce, but not entirely prevent, the flow of fluid. It should be appreciated that such a design allows the same bypass to be used with a variety of flow rates, simply by altering the number and/or diameter of capillary tubes and/or flow restrictors used.

A sensor unit comprising a sensor and sensor conduit is fluidly connected to the housing inlet and outlet via the sensor conduit. The sensor unit may be any flow sensor, such as a mass flow sensor or a volume flow sensor, capable of measuring any physical property of the fluid, such as, but not limited to, temperature and pressure. In a preferred embodiment, the sensor is a thermal mass flow sensor.

In a thermal mass flow sensor, an upstream heating element and a downstream heating element are heated to the same initial temperature above the expected temperature of the fluid. At the initial temperature, the heating elements supply heat to sensor tube 218 as well as to the fluid flowing through the sensor tube 218. When fluid flows through the sensor tube 218, the flow of fluid cools the heating elements, lowering their temperature as a function of mass flow. The flowing fluid cools the upstream heating element more than the downstream heating element. Therefore, more heat will be added to the fluid as it passes through the upstream heating element than when it passes through the downstream heating element because the heating of the fluid by the upstream heating element causes the fluid to be at a higher temperature when it passes the downstream heating element. A circuit, not shown, measures the mass flow rate of the fluid flowing through sensor tube 218 by measuring the difference in temperature. between the upstream heating element and downstream heating element. Other types of thermal mass flow sensors may operate in a different manner, such as by measuring differences in the amount of energy required to maintain the heating elements at the same temperature. It should be appreciated that the present invention is not limited to a particular type of mass flow sensor, as a variety of different types of mass flow sensors (thermal, pressure-based, etc.) may be used. It should further be appreciated that sensors that measure any physical property of the liquids such as, but not limited to, volume, and pressure are also contemplated.

As noted above, according to one aspect of the present invention, the sensor conduit may have a length, inside diameter, and cross-sectional shape substantially equal to those of an individual capillary bypass tube. Like the capillary tube, the sensor conduit may be made of any material selected for its compatibility with the bypass body and the fluid expected to flow through the bypass. For example, the sensor conduit may be made of a non-corrosive material such as metal or plastic. In one embodiment, the sensor conduit is made of a valve metal. In a preferred embodiment, the body is made of 304 stainless steel or a 316 stainless steel. The sensor conduit may also have any cross sectional area and shape designed to provide laminar flow.

Figure 6:
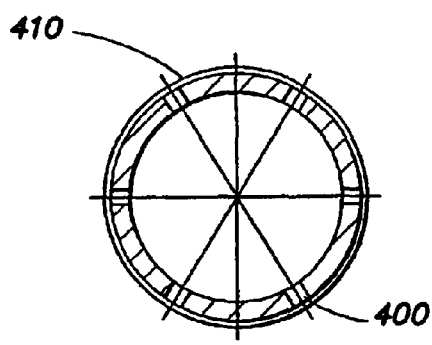
FIG. 6 is a cross section of the bypass of FIG. 5 along line 6—6.

The sensor conduit is fluidly connected to the bypass inlet, where a portion or sample of the fluid flowing into the bypass is redirected to the sensor unit. The fluid inlet may be constructed and arranged to redirect fluid from the inlet to an intermediate location, where the fluid may be collected, prior to delivery to sensor conduit inlet. The inlet end of the bypass may comprise a plurality of apertures which may be in the form of slits, notches, and the like, which may be positioned around the outer circumference of the bypass. By collecting the fluid from a plurality of apertures in an intermediate location, the fluid from different portions of the inlet may mix, thereby delivering a more representative fluid sample flow to the sensor conduit inlet. In one embodiment shown in FIG. 6, the apertures are passageways uniformly spaced about the periphery of the inlet end of the bypass.

This uniformity of spacing permits the mass flow meter to be used in a variety of different orientations.

Figure 7A:
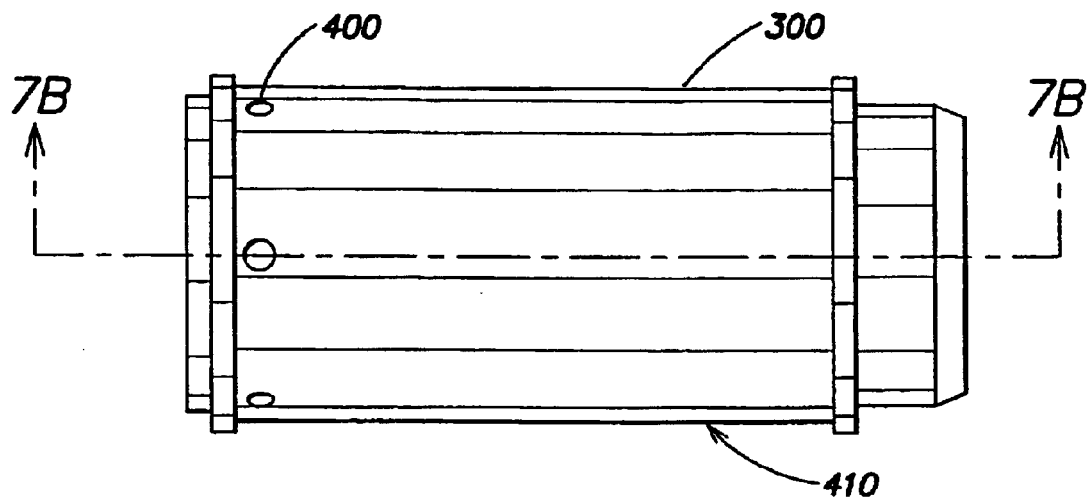
FIG. 7A illustrates one embodiment of the bypass of the FIG. 3A.
Figure 7B:
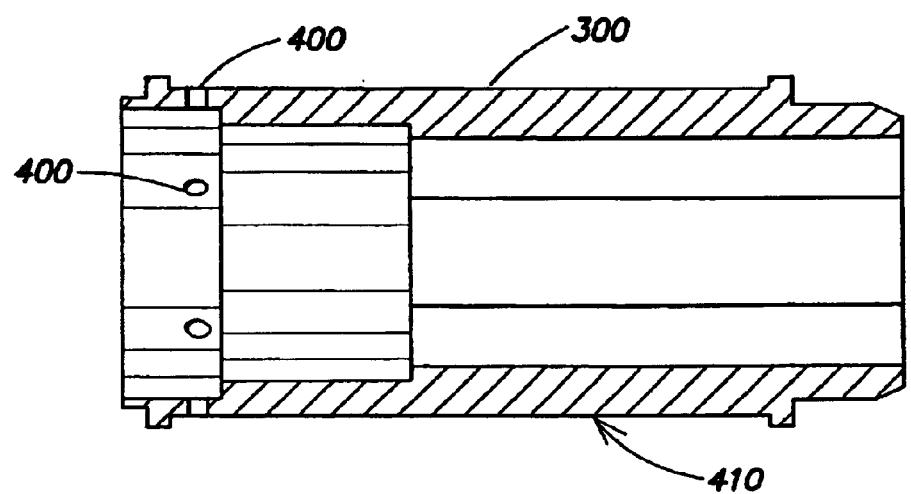
FIG. 7B shows a cross sectional view of the bypass of FIG. 7A along line 7B—7B.

The intermediate location may be part of the bypass or appended to the bypass. The intermediate location for receiving the fluid may be internal to the bypass or adjacent to the bypass, and may be comprised of an individual cavity or a recess extending about the external surface of the bypass. As shown in FIG. 7A, recess 300 forms an annular gap between the exterior surface of the bypass when the bypass is positioned in the housing. In a preferred embodiment the fluid is transported from the inlet through multiple apertures extending from the inlet toward a recess of the outer surface of the bypass, which defines an annular gap when the bypass is positioned within the housing.

Figure 3A:
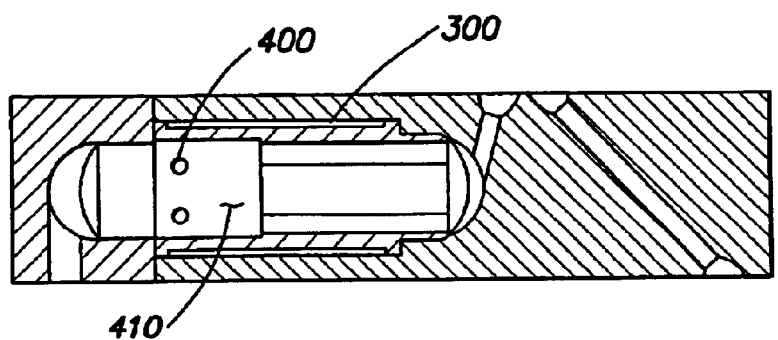
FIG. 3A illustrates one embodiment of a bypass in a fluid bypass housing of the present invention.
Figure 8:
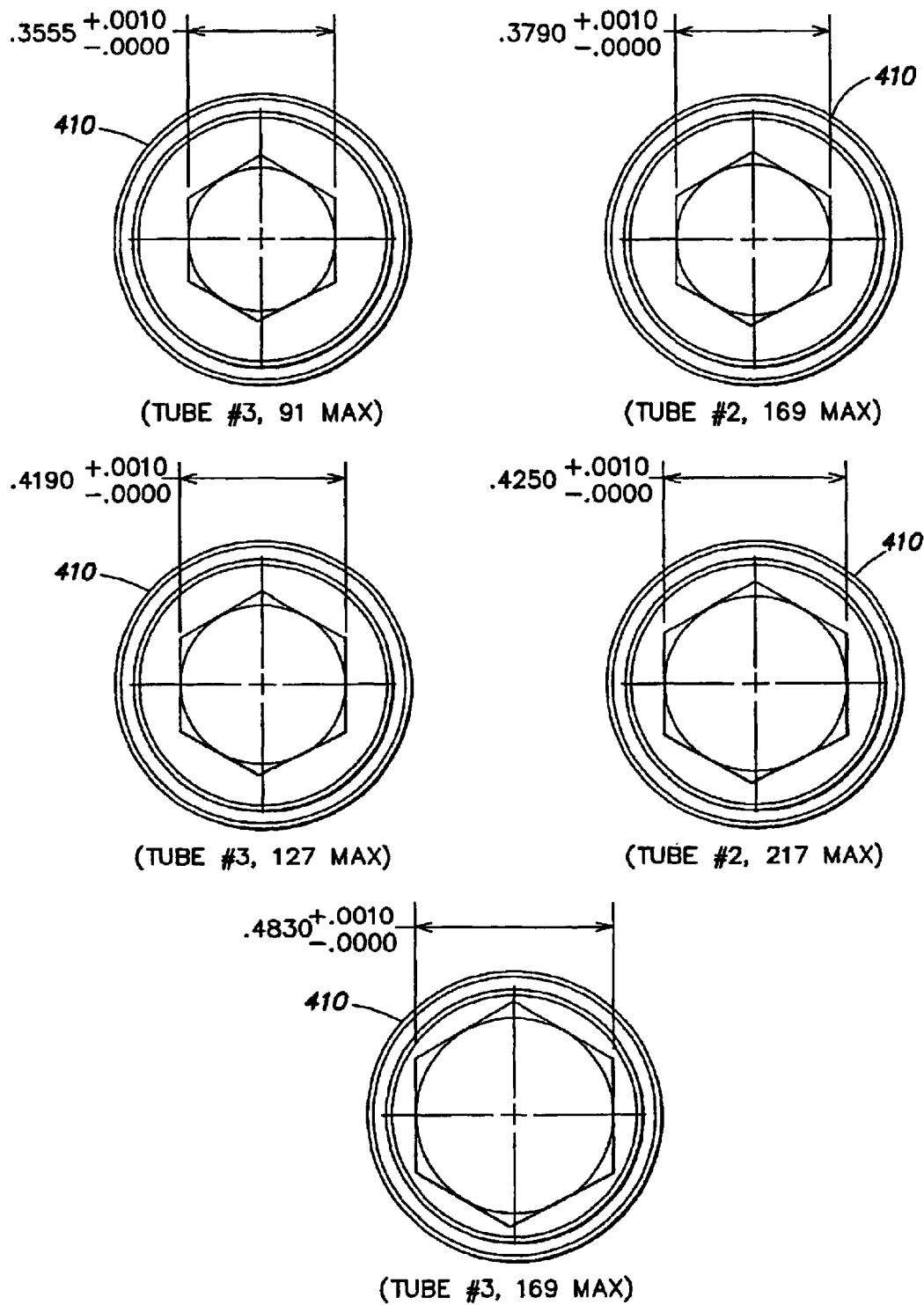
FIG. 8 is end views of the bypass of FIG. 7A.
Figure 15:
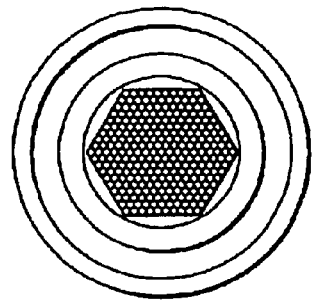
FIG. 15 is an end view of another embodiment of the bypass of the present invention.

FIGS. 3A and 4A illustrate an embodiment of a bypass positioned in a delivery block or housing which may be used for medium flow conditions. Bypass 410 is shown in detail in FIGS. 5A, 5B, 7A, and 7B. The bypass has apertures 400 uniformly spaced about the periphery of the inlet end of the bypass for delivering a uniformly representative sample of the fluid to the sensor. Fluid enters annular gap 300 created when the bypass is positioned in the housing. Fluid from the annular gap enters the sensor conduit. FIG. 8 shows one embodiment of an interior surface of the bypass. The interior surface may be formed to any desired shape. In the embodiment illustrated in FIG. 8, a hexagonal interior surface is formed creating a cavity having a particular cross sectional area depending upon the number of capillary tubes desired for a specific application. For example, as shown in FIGS. 8 and 9, the cross sectional area or the cavity may be modified to accommodate any number of capillary tubes of varying outer and/or inner diameters. For example, FIG. 8 shows hexagonal cavities configured to house 91, 127, or 217 capillary tubes having an outside diameter of approximately 0.037 inch. Similarly, the hexagonal cavity may house 169 or 217 capillary tubes having an outside diameter of approximately 0.0285 inch. FIG. 15 shows a hexagonal cavity configured to house 271 capillary tubes having an outside diameter of approximately 0.185 inch. It should be understood that any number of the capillary tubes positioned within the cavity may be bent to provide tension within the cavity to hold the capillary tubes in place. It should be appreciated that only a slight bend is sufficient for this purpose.

Figure 3B:
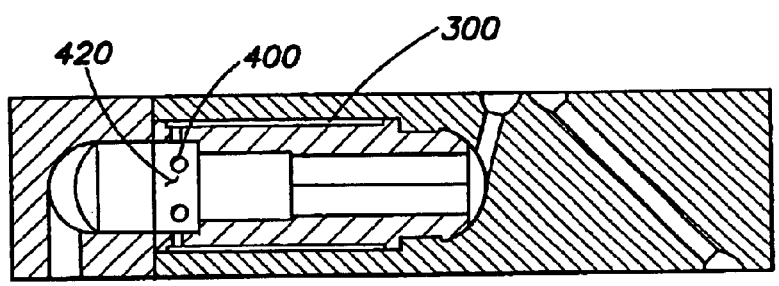
FIG. 3B illustrates another embodiment of a bypass in a bypass housing of the present invention.
Figure 10:
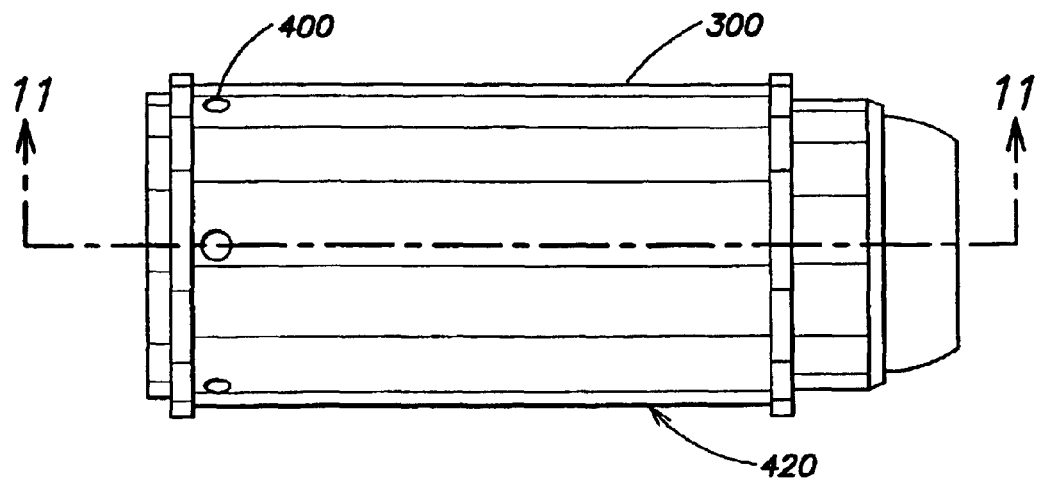
FIG. 10 illustrates another embodiment of a bypass of the present invention.
Figure 11:
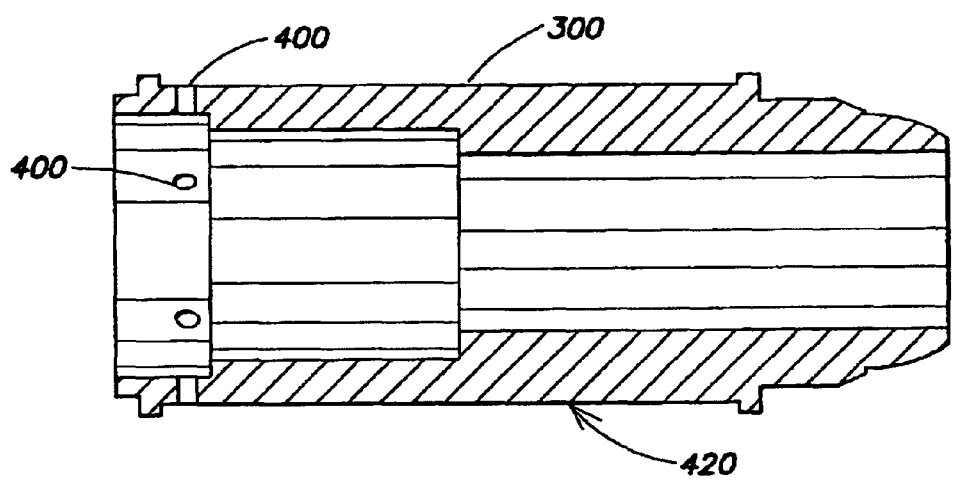
FIG. 11 is a cross sectional view of the bypass of FIG. 10.
Figure 12:
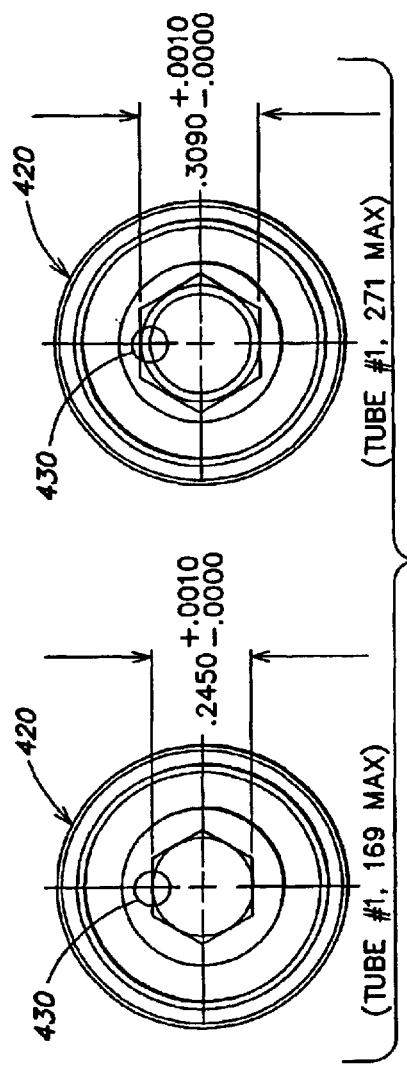
FIG. 12 illustrates an end view of the bypass of FIG. 10.
Figure 14A:
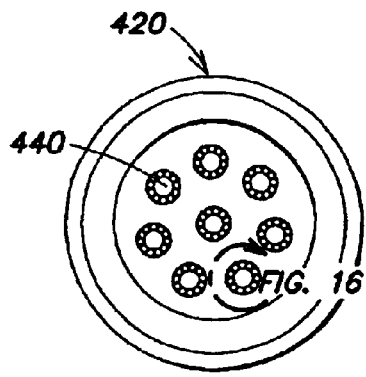
FIG. 14A is an end view of another embodiment of the bypass of the present invention.
Figure 14B:
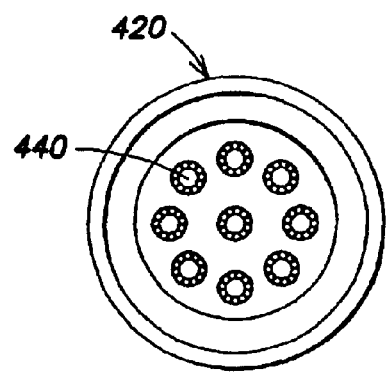
FIG. 14B is an end view of another embodiment of the bypass of the present invention.
Figure 16:
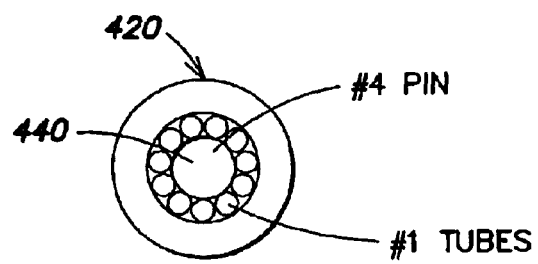
FIG. 16 is an end view of one embodiment of a bypass aperture with capillary tubes and flow restrictor.

FIG. 3B illustrates another embodiment of a bypass positioned in a delivery block or housing which may also be used for medium flow conditions. Bypass 420, also shown in FIG. 4A and in detail in FIGS. 10 and 11 includes apertures 400 and annular gap 300. As seen in FIGS. 12 and 13, individual flow apertures 430 for supporting the capillary tubes may be formed in the bypass. FIG. 13 shows a number of flow apertures uniformly spaced about the perimeter of the bypass, and may include a central flow aperture. As seen in FIGS. 14A and 14B, the diameter and location of each flow aperture may vary depending upon the number of capillary tubes desired. Each flow aperture may be entirely filled with capillary tubes. Alternatively, capillary tubes may be positioned around a central pin 440, or flow restrictor, as seen in greater detail in FIG. 16. It should be understood, that any combination and configuration of flow apertures may be used to house the desired number of straight and/or bent capillary tubes.

Figure 3C:
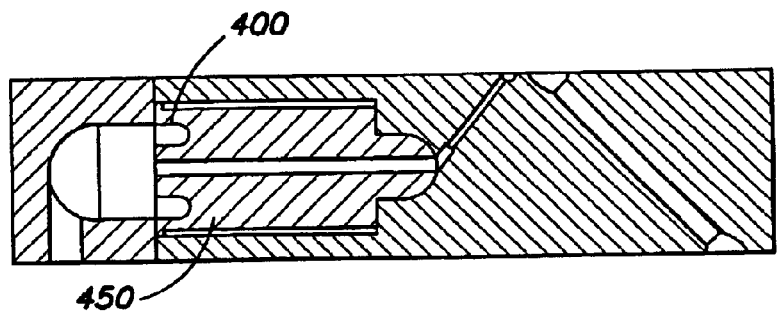
FIG. 3C illustrates another embodiment of a bypass in a bypass housing of the present invention.
Figure 5A:
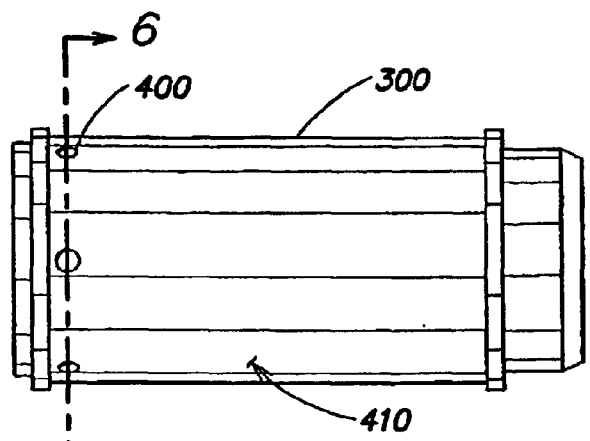
FIG. 5A shows another view of the bypass of FIG. 3A.
Figure 5B:
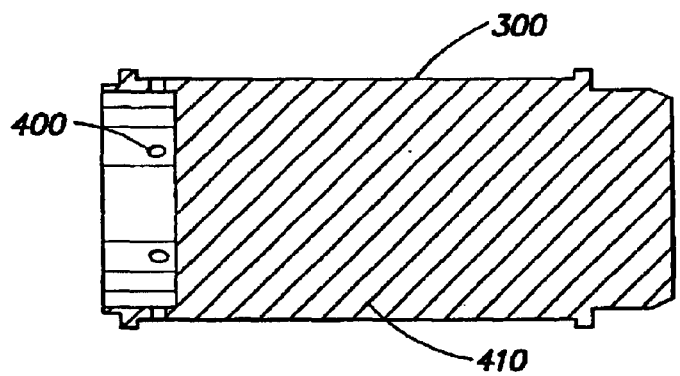
FIG. 5B shows another view of the bypass of FIG. 5A.
Figure 17A:
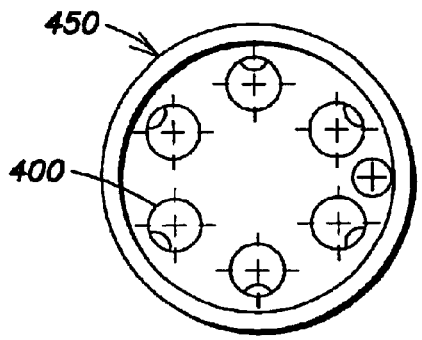
FIG. 17A is an end view of one embodiment of the bypass housing.
Figure 17B:
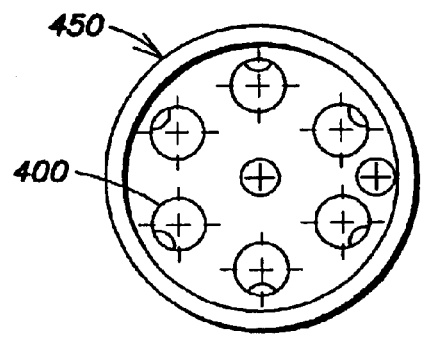
FIG. 17B is an end view of another embodiment of the bypass housing.
Figure 17C:
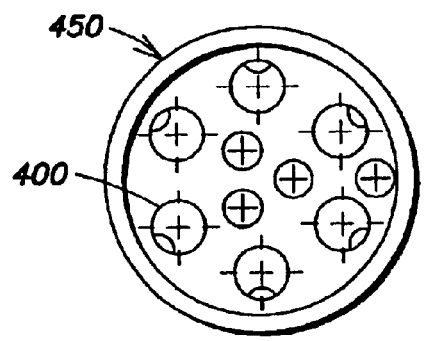
FIG. 17C is an end view of another embodiment of the bypass housing
Figure 18A:
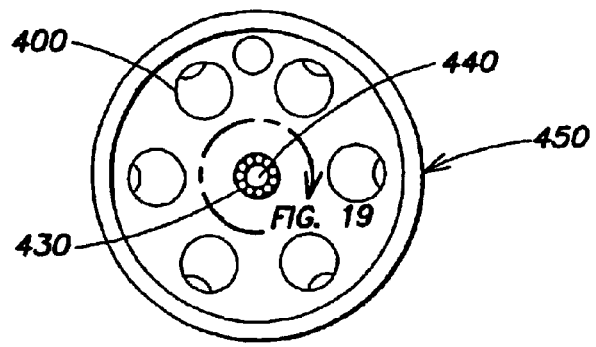
FIG. 18A is an end view of the housing of FIG. 17B illustrating a flow restrictor and capillary tubes.
Figure 18B:
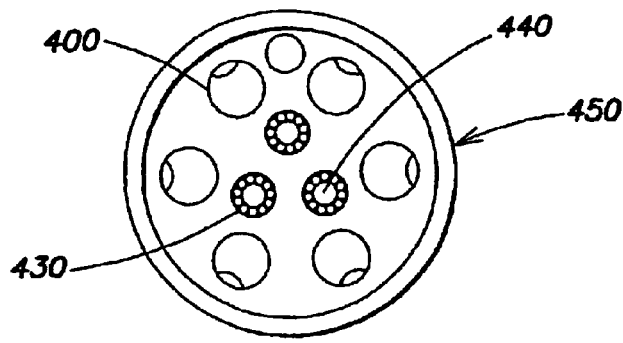
FIG. 18B is an end view of the housing of FIG. 17C illustrating a flow restrictor and capillary tubes.
Figure 19:
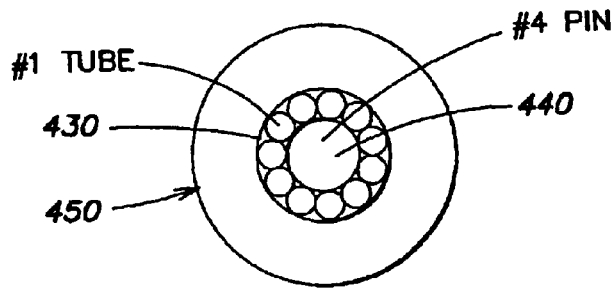
FIG. 19 is an end view of the capillary tube and flow restrictor of FIG. 18A.

FIG. 3C illustrates another embodiment of a bypass positioned in a delivery block which may be used for low flow conditions. Bypass 450, also shown in FIG. 4B include apertures 400 uniformly spaced about the periphery of the inlet end of the bypass as shown in detail in FIG. 17A. FIG. 17B shows one flow aperture positioned at the center of the bypass, which may support 11 capillary tubes surrounding a pin positioned within the flow aperture as seen in FIGS. 18A and 19. Alternatively, multiple flow apertures may be uniformly positioned about the center of the bypass as seen in FIG. 17C, and may support 33 capillary tubes as seen in FIG. 18B. Again it should be understood that any combination and configuration of flow apertures may be used to house the desired number of straight and/or bent capillary tubes.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising", "including", "carrying", "having", "containing", "involving", and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A flow sensor, comprising:
   a housing comprising a fluid inlet and a fluid outlet;
   a bypass disposed between and fluidly connected to the fluid inlet and the fluid outlet, the bypass comprising at least one capillary tube; and
   a sensor unit comprising a sensor conduit having a sensor conduit inlet fluidly connected to the fluid inlet and a sensor conduit outlet fluidly connected to the fluid outlet, wherein the at least one capillary tube has a length substantially equal to a length of the sensor conduit.

2. The flow sensor of claim 1, wherein the at least one capillary tube has a diameter substantially equal a diameter of the sensor conduit.

3. The flow sensor of claim 2, wherein the at least one capillary tube has a cross-sectional shape substantially the same as that of the sensor conduit.

4. The flow sensor of claim 1, wherein the sensor conduit is a capillary tube.

5. The flow sensor of claim 3, wherein an entrance effect of the at least one capillary tube is substantially equal to an entrance effect of the sensor conduit.

6. The flow sensor of claim 1, wherein the housing further comprises means for collecting a fluid.

7. The flow sensor of claim 6, wherein the sensor conduit inlet is fluidly connected to the means for collecting a fluid.

8. The flow sensor of claim 6, wherein the bypass comprises a plurality of capillary tubes.

9. The flow sensor of claim 8, further comprising means for controlling fluid flow through the bypass.

10. The flow sensor of claim 6, wherein the bypass includes a plurality of a uniformly disposed about a periphery of the bypass.

11. The flow sensor of claim 1, wherein the at least one capillary tube has a cross-sectional shape substantially the same as that of the sensor conduit.

12. The flow sensor of claim 1, wherein the at least one capillary tube is oriented substantially along a direction from the fluid inlet to the fluid outlet.

13. A flow sensor, comprising:

a housing comprising a fluid inlet and a fluid outlet;

a bypass disposed between and fluidly connected to the inlet and the outlet, the bypass comprising at least one capillary tube; and a sensor unit comprising a sensor conduit having a sensor conduit inlet fluidly connected to the fluid inlet and a sensor conduit outlet fluidly connected to the fluid outlet, wherein the at least one capillary tube has an entrance effect substantially equal to an entrance effect of the sensor conduit.

14. The flow sensor of claim 13, wherein the bypass includes a plurality of apertures disposed uniformly about a periphery of the bypass and in fluid communication with the sensor conduit, and wherein the sensor unit is substantially insensitive to the orientation of the flow sensor.

15. A process for measuring fluid flow comprising:

passing a fluid through at least one bypass tube having an entrance effect;

passing the fluid through a sensor unit having a sensor conduct with a entrance effect substantially equal to the entrance effect of the at least one bypass tube; and measuring a characteristic of the fluid in the sensor conduit.

* * * * *